United States Patent [19]
Kelley

[11] 3,807,508
[45] Apr. 30, 1974

[54] VARIABLE RIPPER PLOW SHANK ASSEMBLY

[76] Inventor: Leon O. Kelley, P.O. Box 488, Stamford, Tex. 79553

[22] Filed: Jan. 26, 1973

[21] Appl. No.: 327,117

[52] U.S. Cl..................... 172/484, 172/699, 37/193
[51] Int. Cl............................................. A01b 13/08
[58] Field of Search........ 172/699, 700, 484; 37/98, 37/193; 61/72.6

[56] References Cited
UNITED STATES PATENTS

| | | | |
|---|---|---|---|
| 3,738,432 | 6/1973 | Kelley | 172/484 X |
| 3,539,018 | 3/1969 | Sprenkel | 172/484 |
| 3,503,456 | 3/1970 | Larson | 172/699 X |
| 3,527,308 | 9/1970 | Bernotas et al. | 172/699 X |
| 3,295,612 | 1/1967 | Mayo et al. | 172/699 X |
| 3,515,222 | 6/1970 | Kant | 61/72.6 X |

Primary Examiner—Stephen C. Pellegrino
Attorney, Agent, or Firm—D. Carl Richards

[57] ABSTRACT

The specification discloses a variable plow shank positioning assembly for use on a variety of plows. The assembly includes a shank support member pivotally mounted on the rear of a plow frame and including an aperture therein for rigidly receiving a plow shank. Tilt linkages are connected between the shank support member and parallelogram linkage bars. Hydraulic cylinders are connected between the juncture of the shank support member and the tilt linkages and the plow frame to pivot the shank support member and selectively vary the angle of the shank with respet to the plow.

4 Claims, 2 Drawing Figures

VARIABLE RIPPER PLOW SHANK ASSEMBLY

FIELD OF THE INVENTION

This invention relates to plows and more particularly relates to plows having structure for automatically varying the angular position of one or more plow shanks.

THE PRIOR ART

A wide variety of plows, and particularly ripper plows, have been heretofore developed wherein it is desirable to move the plow shank vertically within the plow frame and to pin the shank in a desired position to provide a predetermined shank depth. In addition, it is often desirable to provide different penetration angles to the plow shanks for use in different mediums for maximum plowing results. Examples of plows having automatic systems for varying the angle of a ripper plow shank are disclosed in U. S. Pat. No. 3,116,797, issued Jan. 7th, 1964, and U. S. Pat. No. 3,539,018, issued Nov. 10th, 1970. However, such previously developed variable angle ripper plows have required substantial thrust by the hydraulic cylinders for operation, thereby shortening the life of the cylinders and requiring substantial maintenance. A head has thus arisen for structure for automatically varying the angular position of one or more plow shanks, without exerting a substantial load on the hydraulic cylinders and insuring that the plow shanks remain in a rigid configuration during plowing operations.

SUMMARY OF THE INVENTION

In accordance with the present invention, a plow includes at least one shank, with a shank support member pivotally mounted on the plow and rigidly supporting the shank. Structure is provided to selectively pivot the support member relative to the plow to vary the angle of penetration of the shank.

In accordance with yet another aspect of the present invention, a variable plow shank positioning assembly includes a shank support member pivotally mounted in a plow and including an aperture for rigidly receiving a plow shank. Pressurized fluid cylinders are connected to the shank support member and are operable to pivot the support member and vary the angle of the shank with respect to the plow.

In accordance with a yet more specific aspect of the present invention, a variable ripper plow assembly is provided which is lightweight and narrow, as well as having substantial structural strength. The present ripper plow assembly may be quickly and easily changed from a single ripper shank plow to a generally V-shaped ripper shank array. The ripper plow assembly of the present invention utilizes only a single centrally mounted hydraulic cylinder for raising and lowering the plow assembly. In one embodiment of the invention, a ripper shank array is provided with a central ripper shank pivotally mounted and connected to a pair of hydraulic cylinders. Actuation of the hydraulic cylinders pivots the ripper shank and varies the angle of penetration of the shank.

DESCRIPTION OF THE DRAWING

For a more complete understanding of the present invention and for further objects and advantages thereof, reference is now made to the following description taken in conjunction with the accompanying drawing, in which.

DESCRIPTION OF THE PREFERRED EMBODIMENT

Figure 1:
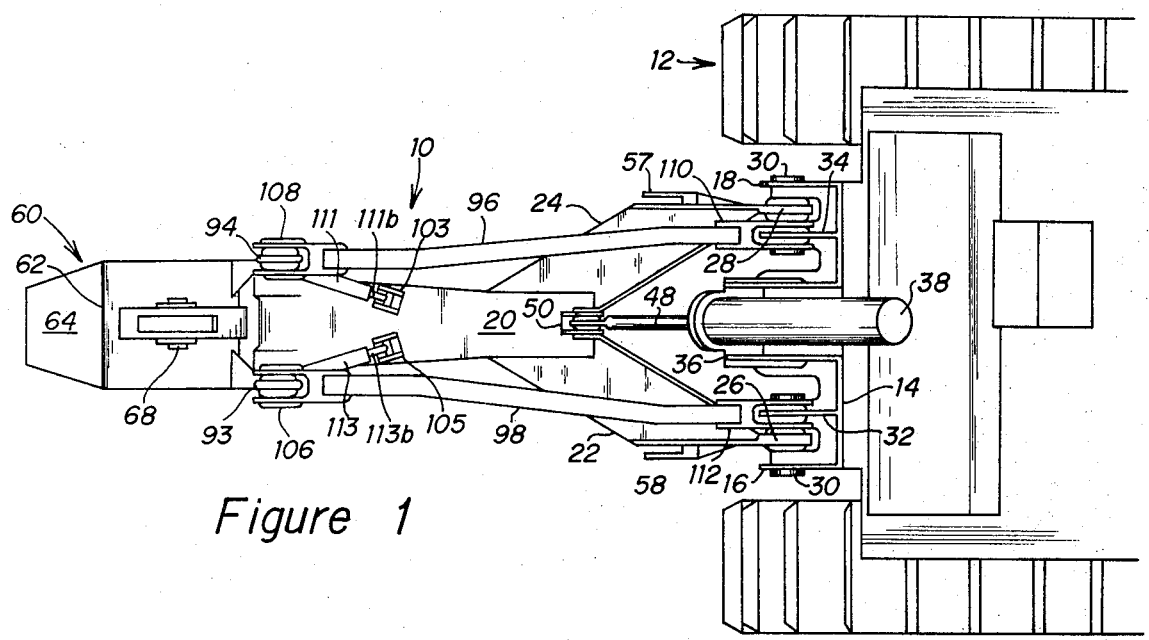
FIG. 1 is a top view of a variable ripper plow assembly connected in a parallelogram lift configuration.
Figure 2:
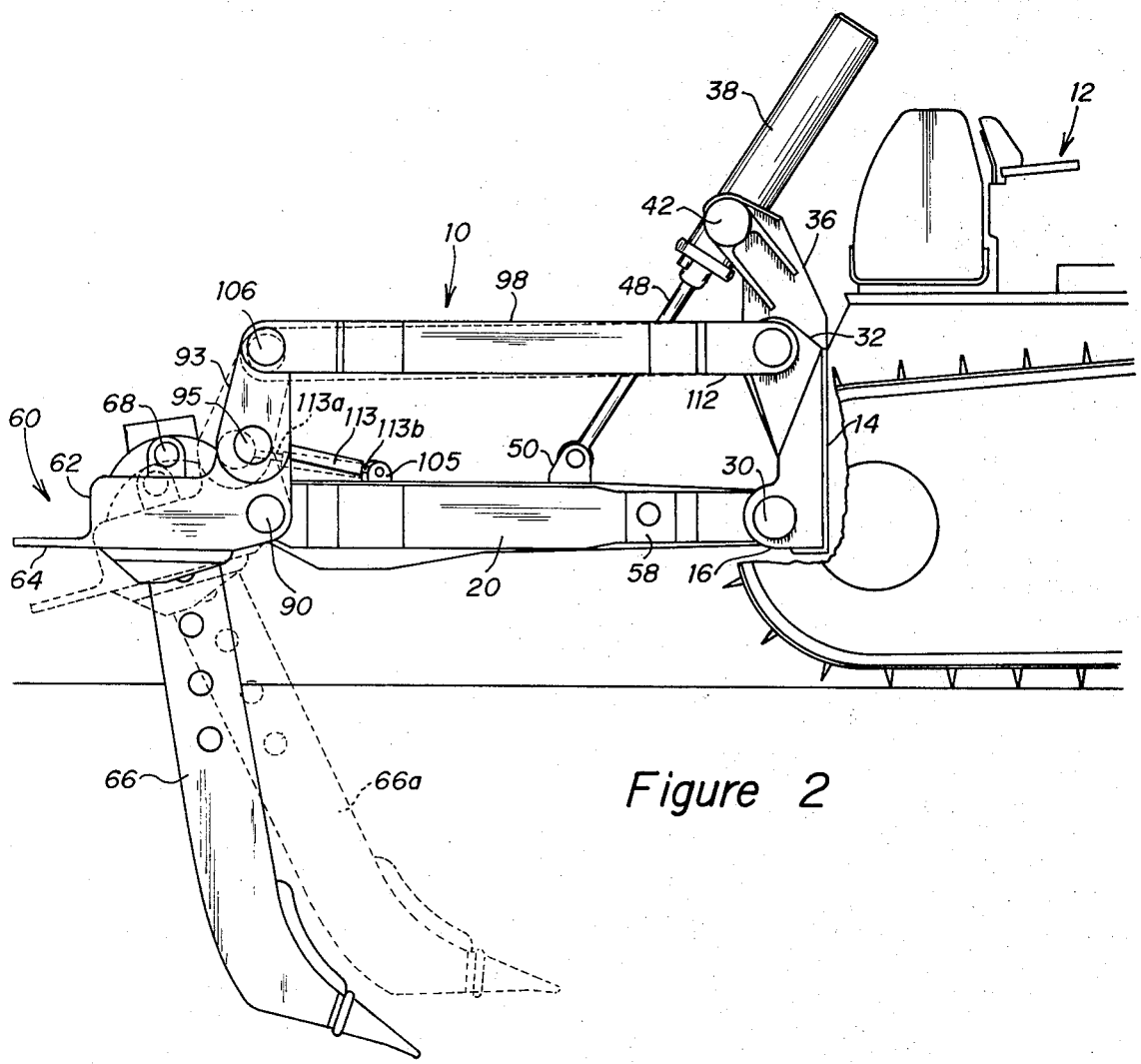
FIG. 2 is a side elevational view of a variable ripper plow assembly shown in FIG. 1.

Referring to FIGS. 1 and 2, the ripper plow assembly of the present invention is identified generally by the numeral 10. A prime mover 12 may comprise for example a caterpillar tractor or the like. An upstanding hitch frame 14 is rigidly connected to the rear of the prime mover 12, the frame 14 including a pair of spaced apart lug assemblies 16 and 18 at the lower end thereof.

A tool bar 20 includes a pair of outwardly diverging arms 22 and 24 having ears 26 and 28 at the forward ends thereof. Ear 26 is adapted to be received by the lug assembly 16, while ear 28 is adapted to be received by the lug assembly 18. Pins 30 are passed through apertures in the lug assemblies and the ears 26 and 28 to pivotally connect the tool bar 20 to the lower portion of the frame 14. The outwardly diverging arms 22 and 24 of the tool bar 20 form a generally V-shaped configuration, while the rearward end of the tool bar 20 is elongated and relatively narrow.

A pair of lugs 32 and 34 extend rearwardly from and are rigidly connected to the upper part of the frame 14. Lugs 32 and 34 are disposed on opposite sides of an upwardly extending hydraulic cylinder support 36. The cylinder support 36 has a generally U-shaped cross section and is adapted to be rigidly connected to the hitch frame 14. The hydraulic cylinder 38 is pivotally mounted in an inclined position in the upper portion of the support 36.

Trunnions 42 are adapted to extend through apertures (not shown) in the cylinder support 36 to pivotally connect the cylinder 38 within the cylinder support 36, as shown in FIGS. 1 and 2. Similar trunnion mountings for hydraulic cylinders are presently utilized in the commercially available KR-25D ripper plow manufactured and sold by the Kelley Products Division of CRC-Crose International, Inc. Hydraulic lines leading to the cylinder 38 have been omitted for clarity of illustration, but the hydraulic control system of the tractor is connected with the cylinder 38 for control thereof. The output shaft 48 from the hydraulic cylinder 38 is pivotally pinned at the lower end thereof between a lug assembly 50. Lug assembly 50 is rigidly interconnected at the juncture of the arms 22 and 24 of the tool bar 20.

Flanges 57 and 58 extend rigidly from the sides of the tool bar 20 for receiving lateral support bars when a multiple shank housing is connected to the plow. Apertures are formed in flanges 57 and 58 for receiving pins for securing the support bars.

The variable ripper shank assembly 60 of the present invention comprises a shank supporting housing 62 having a rearwardly extending push extension 64. A variable ripper plow shank 66 extends through an aperture in the housing 62 and is rigidly interconnected therewith by a pin 68. The variable plow shank 66 includes a number of apertures therethrough so that the effective length of the shank may be selectively adjusted within the housing 62.

The shank supporting housing 62 includes a yoke assembly which receives the rearward end of the tool bar 20 and is pivotally connected thereto by pins 90. The yoke assembly includes a pair of ears 91 and 92 which include apertures through the upper ends. The ears 91 and 92 are connected to a pair of tilt linkages 93 and 94. The tilt linkages have apertures at both the lower and upper ends thereof and are connected to the ears 91 and 92 at the lower ends by pins 95. A pair of parallelogram linkage bars 96 and 98 are rigidly interconnected by a bar 100 and include lug assemblies 102 and 104 at the rearward end thereof. Pins 106 and 108 are inserted through the lug assemblies and through the apertures in the upper ends of the tilt linkages 93 and 94 to pivotally attach the linkages 93 and 94 to the bars 96 and 98. Bars 96 and 98 include at the forward end thereof lug assemblies 110 and 112 which are pivotally connected to lugs 32 and 34 by suitable pins. As described in Applicant's co-pending patent application Ser. No. 146,253, the parallelogram bar assembly may be repinned to lugs located on the tool bar (not shown) to provide a radial plow lift configuration.

A pair of apertured flanges 103 and 105 are formed on the tool bar 20. A pair of hydraulic cylinders 111 and 113 include lug assemblies 111a and 113a at the ends of the cylinders and lug assemblies 111b and 113b at the ends of the pistons. The 111a and 113a are pivotally attached by pins 95 to the juncture of the ears 91 and 92 and the tilt linkages 93 and 94. The lug assemblies 111b and 113b are pivotally attached to the flanges 103 and 105.

Hydraulic lines leading to the cylinders 111 and 113 have been omitted for clarity of illustration, but the hydraulic control system of the tractor is connected with the cylinders 111 and 113 for control thereof.

As shown in FIG. 2, the angle of the ripper plow shank 66 may be varied by actuation of the hydraulic cylinders 111 and 113. When the cylinders 111 and 113 are unactuated, the shank 66 is maintained in the illustrated position which is essentially vertical. When the cylinders 111 and 113 are actuated by the operator of the prime mover, the pistons are forced from within the cylinders to pivot the shank supporting housing 62 about the pins 90 and the tilt linkages 93 and 94 about the pins 95 so that the components of the variable ripper shank assembly 60 assume the positions illustrated in phantom by the dashed lines of FIG. 2. As can be seen, the angle of the ripper plow shank 66a is tilted substantially from the vertical position when the cylinders 111 and 113 have been actuated. Of course, any intermediate tilt position can be selected by proper operation of the hydraulic cylinders 111 and 113. The positioning of the cylinders 111 and 113 requires less trust during operation than prior art devices, as the configuration provides greater leverage.

It is to be understood that the variable ripper shank assembly of the present invention may be used with other plow lift configurations and with multiple shanks as shown in co-pending application Ser. No. 146,253, now U.S. Pat. No. 3,738,432, entitled RIPPER PLOW ASSEMBLY, filed May 24th, 1971, in the name of the present applicant.

It will be seen that the present invention provides a useful tool for automatically and accurately positioning the angle of penetration of plow shanks, and in particular heavy duty ripper plow shanks. The system is rugged and requires little maintenance, while maintaining the plow shanks in a rigid configuration regardless of the desired angular position selected. The system is adapted for a selection of a number of different configurations of plows and plow types.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A variable ripper plow assembly comprising:
    a hitch frame adapted for connection to a prime mover;
    a tool bar including a pair of arms converging outwardly toward a relatively narrow rearward end structure, said arms having their inner ends pivotally connected to said hitch frame;
    a ripper shank support pivotally connected to the rear end of the tool bar including a pair of upwardly extending ears;
    a ripper shank rigidly secured within said shank support at a location intermediate said ears, said shank being adjustably pinned to said shank to permit selectively vertical adjustment of said shank relative to said support;
    a pair of tilt linkages pivotally connected to the upper portions of said ears;
    a pair of lift linkages extending between said tilt linkages and said hitch frame and being pivotally connected to same;
    first hydraulic cylinder means intermediate said tool bar arms having oppositely extending trunnions secured to said hitch frame and operatively connected to said tool bar; and
    second hydraulic cylinder means operatively connected at one end to the juncture of said ears and said tilt linkages and at the opposite end to said tool bar, whereby said tool bar may be selectively lifted by operation of said first cylinder means and said shank support may be selectively tilted by operation of said second cylinder means.

2. The ripper plow assembly of claim 1 wherein said second hydraulic cylinder means comprises a pair of hydraulic cylinders.

3. The ripper plow assembly of claim 1 wherein said hydraulic cylinder means are pivotally connected at one end to said tool bar intermediate said hitch frame and said ripper shank support.

4. The ripper plow assembly of claim 1 wherein said first hydraulic cylinder means comprises a single hydraulic cylinder connected at the juncture of said pair of arms of said tool bar.

* * * * *